US 9,998,460 B2

(12) United States Patent
Modi et al.

(10) Patent No.: US 9,998,460 B2
(45) Date of Patent: Jun. 12, 2018

(54) DIAMETER REDIRECT BETWEEN CLIENT AND SERVER

(71) Applicant: AT&T Intellectual Property I, L.P., Atlanta, GA (US)

(72) Inventors: Bhuvan Modi, Redmond, WA (US); Amjad Sandouka, Issaquah, WA (US); Arun K. Chatterjee, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 4 days.

(21) Appl. No.: 14/753,300

(22) Filed: Jun. 29, 2015

(65) Prior Publication Data

US 2016/0381019 A1 Dec. 29, 2016

(51) Int. Cl.
*H04L 29/00* (2006.01)
*H04L 29/06* (2006.01)
*H04L 29/08* (2006.01)
*H04L 29/14* (2006.01)

(52) U.S. Cl.
CPC ...... *H04L 63/0892* (2013.01); *H04L 67/1029* (2013.01); *H04L 67/1034* (2013.01); *H04L 69/40* (2013.01)

(58) Field of Classification Search
CPC .................................................. G06F 15/173
USPC ............................................................ 726/4
See application file for complete search history.

(56) References Cited

U.S. PATENT DOCUMENTS

| 6,662,228 | B1* | 12/2003 | Limsico ................. H04L 63/04 709/225 |
|---|---|---|---|
| 7,530,095 | B2 | 5/2009 | Lee et al. |
| 7,953,884 | B2 | 5/2011 | Agarwal et al. |
| 8,201,219 | B2 | 6/2012 | Jones |
| 8,726,068 | B2 | 5/2014 | Korhonen et al. |
| 8,964,529 | B2 | 2/2015 | Mann et al. |
| 2008/0291876 | A1 | 11/2008 | Mukherjee et al. |

(Continued)

OTHER PUBLICATIONS

Tzouanopoulos Dionysis/ Security issues at NGN networks/ Feb. 22, 2012/ University of Piraeus Greece/ pp. 1-62.*

(Continued)

*Primary Examiner* — Brandon Hoffman
*Assistant Examiner* — Michael D Anderson
(74) *Attorney, Agent, or Firm* — Zagorin Cave LLP

(57) ABSTRACT

A technique redirects a Diameter client command from a first server that has become unavailable to a second server consistent with a Diameter protocol. A method includes identifying a first authentication server as unavailable based on a redirect indication received from a second authentication server via a routing agent in response to a request for authentication of a user to the first authentication server. The method includes authenticating the user by the second authentication server in response to a subsequent request for authentication of the user to the second authentication server. The subsequent request for authentication includes an indication of a failure of the first authentication server. The method may include establishing a first service session in response to authenticating the user by the first authentication server and maintaining the first service session using the IP address of the first service session while the second authentication server authenticates the user.

19 Claims, 5 Drawing Sheets

(56) References Cited

U.S. PATENT DOCUMENTS

2009/0185494 A1    7/2009   Li et al.
2013/0198353 A1    8/2013   Hua et al.
2014/0003225 A1    1/2014   Mann et al.
2015/0036486 A1    2/2015   McMurry et al.
2015/0049605 A1    2/2015   Mann

OTHER PUBLICATIONS

Mapoka, T., et al. "Handover Optimised Authentication Scheme for High Mobility Wireless Multicast," 17th UKSIM-AMSS International Conference on Modelling and Simulation, IEEE 2015, pp. 526-531.

Eronen, P., et al. "Diameter Extensible Authentication Protocol (EAP) Application," Network Working Group, Request for Comments: 4072, Category: Standards Track, Aug. 2005, pp. 1-33.

Fajardo, V., et al. "Diameter Base Protocol," Internet Engineering Task Force (IETF) Request for Comments: 6733, Obsoletes: 3588, 5719, Category: Standards Track, ISSN: 2070-1721, Oct. 2012, pp. 1-152.

* cited by examiner

DIAMETER REDIRECT BETWEEN CLIENT AND SERVER

BACKGROUND

Field of the Invention

The present invention is related to communications systems and more particularly to distributed network elements that use Diameter protocol.

Description of the Related Art

In general, a networking protocol may provide centralized management of network services for users that connect and use those network services. Internet service providers and enterprises use networking protocols to manage access to the Internet or internal networks, wireless networks, and integrated email services. The network may include modems, access points, network ports, servers, etc. that communicate over an Internet Protocol (IP) channel from user equipment to an all-IP network core, which may provide access to other networks. Individual nodes of the network may use client/server protocols that execute in an application layer to standardize communications throughout the network. For example, Diameter protocol provides a framework for authentication, authorization and accounting by distributed systems to control which users are allowed access to which services and to track which resources they have used. However, individual nodes of the network may become unavailable e.g., due to node failure, routine maintenance, or connectivity issues. Accordingly, techniques that handle unavailability of a Diameter node are desired.

SUMMARY OF EMBODIMENTS OF THE INVENTION

A technique for redirecting a Diameter client command from a first server that has become unavailable to a second server consistent with a Diameter protocol includes the Diameter client indirectly determining that the first server is unavailable and sending a failure indicator in a subsequent command to the second server. In at least one embodiment of the invention, a method includes identifying a first authentication server as unavailable based on a redirect indication received from a second authentication server via a routing agent in response to a request for authentication of a user to the first authentication server. The method includes authenticating the user by the second authentication server in response to a subsequent request for authentication of the user to the second authentication server. The subsequent request for authentication includes an indication of a failure of the first authentication server. The request for authentication of the user and the subsequent request for authentication of the user may be associated with user communications via a wireless access point of a local area network. The method may include establishing a first service session in response to authenticating the user by the first authentication server in response to a prior request for authentication. The method may include sending a notification to the user to maintain an Internet Protocol (IP) address of the first service session. The method may include maintaining the first service session using the IP address of the first service session while the user is authenticated by the second authentication server. The method may include receiving an indication of authentication for a first service session in response to authenticating the user by the first authentication server in response to a prior request for authentication. The method may include terminating a user service session in response to the indication of the failure of the first authentication server. Authenticating the user by the second authentication server may include fetching a user profile from a subscriber server by the second authentication server using the indication of the failure of the first authentication server. The first authentication server and the second authentication server may be Diameter protocol authentication, authorization and accounting servers and the request for authentication and the subsequent request for authentication are Diameter Extensible Authentication Protocol (EAP) Request (DER) commands.

In at least one embodiment of the invention, an apparatus includes a network node. The network node includes a communications interface and protocol processing logic responsive to a request for authentication of a user received using the communications interface. The protocol processing logic is configured to identify a first authentication server as unavailable based on a redirect indication received from a second authentication server via a routing agent in response to communicating the request for authentication of the user with the first authentication server to the routing agent. The protocol processing logic is further configured to send a subsequent request for authentication of the user to the second authentication server via the routing agent, the subsequent request for authentication including an indication of a failure of the first authentication server. The apparatus may include user equipment configured to maintain an existing service session using a wireless access point while the user is authenticated by the second authentication server for a second service session in response to a message from the network node. The existing service session may be established with a first Internet Protocol (IP) address in response to authentication of the user by the first authentication server based on a prior request for authentication. The protocol processing logic may be further configured to request authentication of the user by the first authentication server in response to a prior request for authentication and send a notification to the user to maintain an IP address of an existing service session in response to the redirect indication received from the second authentication server in response to the request. The apparatus may include the second authentication server configured to fetch a user profile from a subscriber server using the indication of the failure of the first authentication server. The apparatus may include a routing agent coupled between the network node and the first authentication server and the second authentication server. The network node may be a Diameter protocol client and the routing agent may be a Diameter protocol routing agent and the request for authentication may be a Diameter Extensible Authentication Protocol (EAP) Request (DER) message. The network node may be an evolved Packet Data Gateway.

In at least one embodiment of the invention, a method includes initiating authentication of a user with a first authentication server for a first service session with an Internet Protocol (IP) address using a local area network access point. The method includes initiating authentication of the user with a second authentication server while maintaining the first service session using the IP address in response to receiving a notification to maintain the IP address and to initiate the authentication of the user with the second authentication server. The method may include identifying the first authentication server as unavailable based on a redirect indication received from the second authentication server via a routing agent in response to a request for authentication of the user to the first authentication server after establishing the first service session. The method may include authenticating the user by the second authentication server in response to initiating authentication using an indication of a failure of the first authentication server. Authenticating the user by the second authentication server may include fetching a user profile from a subscriber server by the second authentication server using the indication of the failure of the first authentication server. The first authentication server and the second authentication server may be Diameter protocol authentication, authorization and accounting servers.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
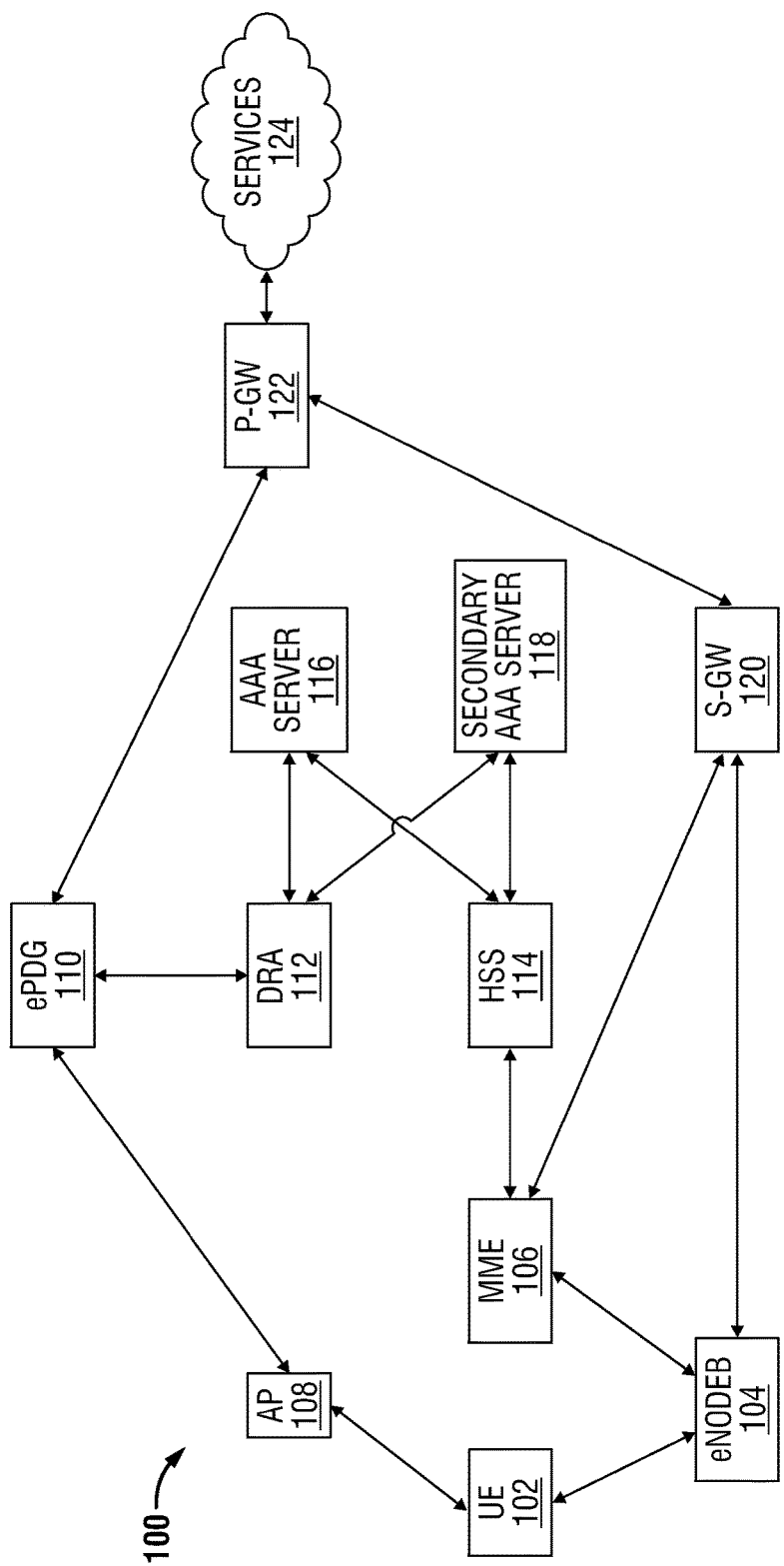
FIG. 1 illustrates a functional block diagram of an exemplary communications network.

Referring to FIG. 1, an exemplary communications network compliant with $3^{rd}$ Generation Partnership Project (3GPP) system specifications uses an Authentication, Authorization, and Accounting (AAA) protocol (e.g., Diameter protocol) for computer networks to provide centralized management for users that connect to the system. The Diameter protocol is a packet protocol that uses the Transmission Control Protocol (TCP) of the Internet Protocol (IP) Suite and Stream Control Transmission Protocol (SCTP). Each packet includes a header (e.g., a header including version information, message length, command flag field, command code, application identifier, hop-by-hop identifier, end-to-end identifier) and a variable number of Attribute-Value Pairs (AVPs) for encapsulating information relevant to the message. Each command Request/Answer pair is assigned a command code, and the request or answer is identified by a bit in the command flags field of the header. Diameter clients include evolved Packet Data Gateways (ePDGs), Packet Data Network (PDN) Gateways (P-GWs), and Secure Entitlement Servers (SES). In general, each node following the Diameter protocol maintains two tables: a peer table and a realm-based routing table. A realm-based routing table includes routing and processing information of all peers present in the peer table.

User equipment 102 connects to the Evolved Packet Core (EPC) by a secure data connection provided by evolved Packet Data Gateway (ePDG) 110 via an untrusted, non-3GPP wireless access point 108. Evolved Packet Data Gateway 110 is a Diameter client that authenticates access to the user by using primary AAA server 116. A typical implementation of network 100 includes a primary AAA server 116 and secondary AAA server 118. The primary AAA server 116 and secondary AAA server 118 can be accessed by ePDG 110 via Diameter Routing Agent (DRA) 112. In general, a Diameter routing agent facilitates movement of packets in a network (e.g., simple routing, proxying and redirect). A DRA may be any functional element in the network that provides real-time routing capabilities to ensure that messages are routed among correct elements in a network. An exemplary DRA includes a routing engine that implements routing rules and policies. However, note that network 100 is exemplary and teachings described herein are applicable to any network routing architecture that includes elements that exchange Diameter messages or other similar protocol.

Primary AAA server 116 may become unavailable due to an outage or planned maintenance and DRA 112 may detect this unavailability, e.g., by detecting the absence of Diameter watchdog messages. However, a Diameter client (e.g., ePDG 110) may continue to send new authentication and authorization requests indefinitely and does not identify that primary AAA server 116 has become unavailable, causing the Diameter call flow to loop in response to unavailability of primary AAA server 116. For example, referring to FIGS. 1 and 2, user equipment establishes access to a data network by issuing Internet Key Exchange Protocol Authentication Request (IKE_AUTH_REQUEST) message 202 to Diameter client 110. In response to IKE_AUTH_REQUEST message 202, Diameter client 110 issues, to a Diameter server (e.g., DRA 112), a Diameter Extensible Authentication Protocol (EAP) Request (DER) command 204, which includes a destination realm attribute. Diameter Routing Agent 112, routes DER command 204 to primary AAA server 116 using DER command 206 including the destination realm attribute, which indicates a particular realm to which the message is routed and an associated serving AAA server. In response to DER command 206, primary AAA server 116 authenticates the user using any suitable authentication and authorization techniques, and issues a Diameter Extensible Authentication Protocol (EAP) Answer (DEA) command 208 including an attribute indicating that primary AAA server 116 is the Diameter Origin-Host (i.e., originator of the message). If DEA command 210 indicates success, then user equipment 102 establishes a first service session for user equipment 102 via access point 108 using a first Internet address.

In response to subsequent activity (e.g., reauthentication of user equipment 102 for the first service session or an attempt to establish a second service session for user equipment 102, Diameter client 110 issues a subsequent DER command 212 with primary AAA server 116 as the destination host. Meanwhile, primary AAA server 116 has become unavailable. Accordingly, DRA 112 performs realm-base routing (e.g., DRA 112 finds another server from the realm-based routing table), identifies secondary AAA server 118 as a new serving AAA server, and issues DER command 214 to secondary AAA server 118. After receiving this Diameter message, secondary AAA server 118 checks the destination host value in the message, which is still indicated as the primary AAA server 116. Secondary AAA server 118 determines that the user data does not exist in secondary AAA server 118. Hence, secondary AAA server 118 server queries HSS 114 to retrieve access authentication and authorization data. If the record in HSS 114 still points to primary AAA server 116, it returns that server name (i.e., primary AAA server 116) to secondary AAA server 118. Subsequently, secondary AAA server 118 forwards authentication and authorization data to DRA 112 and DRA 112 then forwards the authentication and authorization data to Diameter client 110.

Diameter client 110 does not infer that primary AAA server 116 is unavailable from the above message exchange. The Diameter client continues to send the DER request to primary AAA server 116 without the redirection error information and, as described above, the DER request reaches secondary AAA server 118, which responds with a DEA message including the redirection error indication, and the origin host as the name of primary AAA server 116 and results in a loop of DER and DEA commands Since primary AAA server 116 is not directly communicating with the Diameter client, Diameter Watchdog Request/Response failures are only visible to DRA 112, and the Diameter client does not identify the failure status of primary AAA server 116.

Secondary AAA server 118 responds to the Diameter client with the DEA command 216 including the Result-Code set to Diameter_Redirect_indication and Redirect-Host set to the Diameter identity of primary AAA server 116 currently serving the user. This attribute indicates to DRA 112 that primary AAA server 116 is unavailable and DRA 112 sends DEA command 218 to Diameter client 110. In response to DEA command 218, Diameter client 110 issues another DER command, but without providing any indication of the redirection to secondary AAA server 118. As a result, commands 212-218 repeat in loop 220, secondary AAA server 118 cannot take over, and user equipment 102 does not gain continued or additional access to services 124. The Diameter protocol and other portions of the 3GPP IP Multimedia Subsystem do not identify this condition or address how to handle it. Accordingly, a user may need to reauthenticate by a manual process (e.g., power cycle of user equipment 102 and/or access point 108) to regain access to the network using Diameter client 110. Thus, a technique is desired to detect that a serving AAA server has become unavailable for a Diameter client coupled to an AAA server by an intervening DRA.

Figure 2:
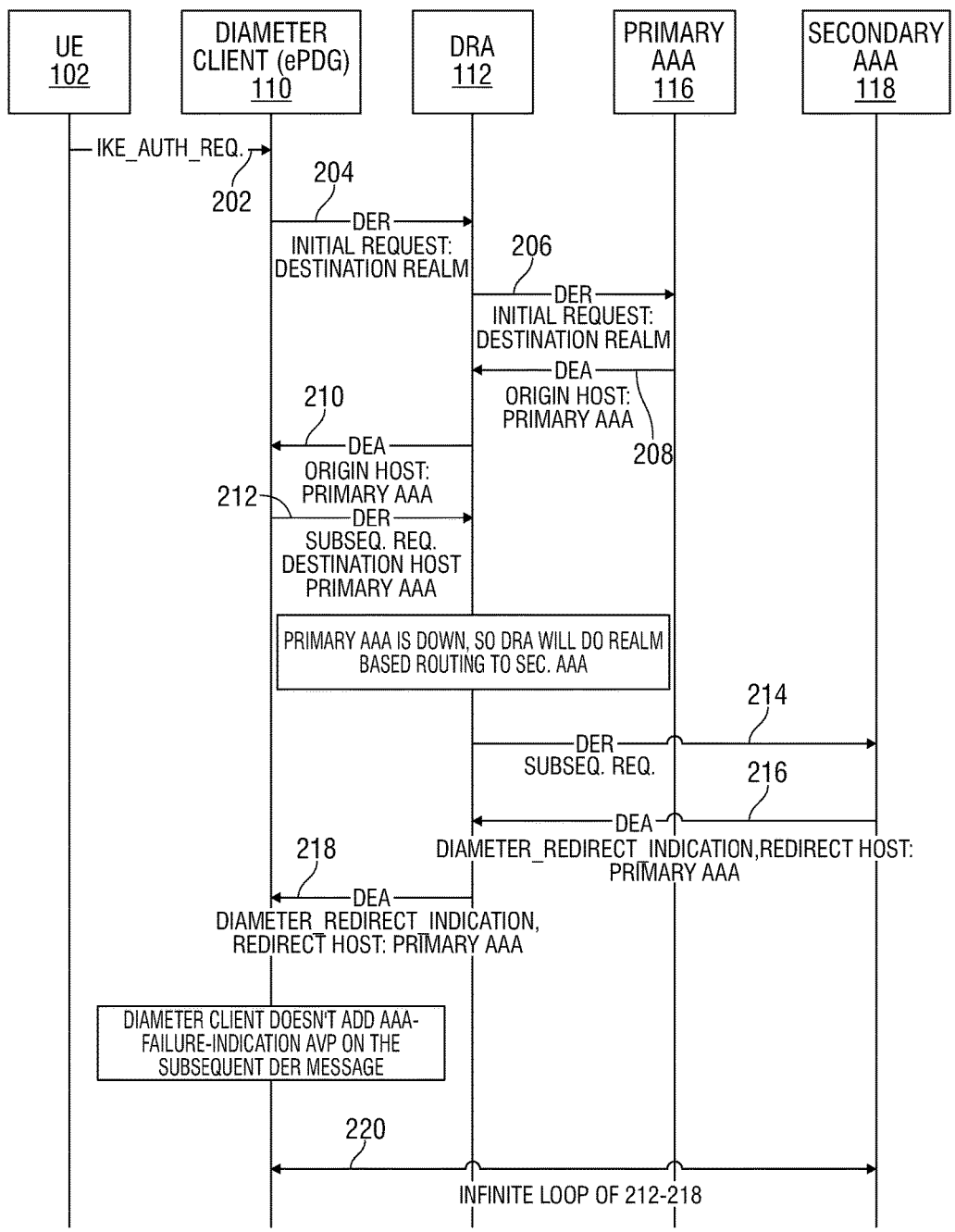
FIG. 2 illustrates information and control flows for authentication in an exemplary Diameter protocol communications network.
Figure 3:
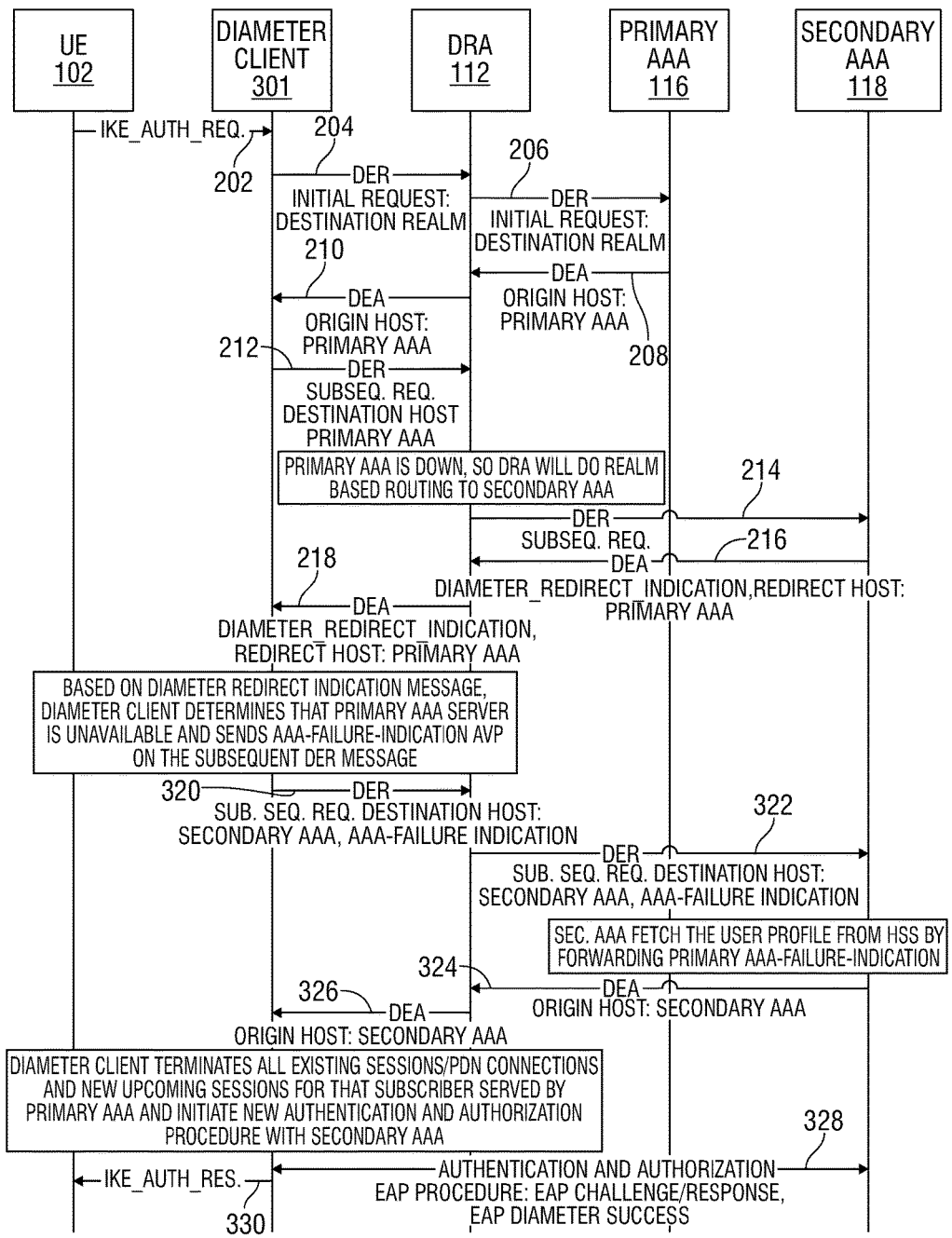
FIG. 3 illustrates information and control flows for authentication in a Diameter protocol communications network that redirects a Diameter client from a first Authentication, Authorization, and Accounting (AAA) server to a second AAA server consistent with at least one embodiment of the invention.

A technique for detecting by a Diameter client that a serving AAA server coupled to the Diameter client by an intervening DRA has become unavailable and providing redirection in response to that unavailability includes the Diameter client identifying the unavailability and sending a failure indication to avoid the loop of FIG. 2. Referring to FIG. 3, the redirection technique performs initial authentication and authorization and establishes a first service session, e.g., using Diameter client 310 in place of Diameter client 110 of FIGS. 1 and 2, commands 202-210, and subsequent request commands 212-218, similar to those commands of FIG. 2 described above. Referring back to FIG. 3, in response to DEA command 218, Diameter client 301 identifies primary AAA server 116 as being unavailable and updates an associated indicator in memory. Diameter client 301 sends an AAA-failure-indication AVP in subsequent DER command 320 and Destination Host AVP indicating the secondary AAA server 118 from the realm-based routing table. In response, DRA 112 issues a DER command 322 to secondary AAA server 118, but indicating the secondary AAA in the destination host AVP and including the AAA failure indication. Accordingly, secondary AAA server 118 fetches the user profile including access authentication and authorization data from HSS 114 by forwarding the primary AAA failure indication to HSS 114. Secondary AAA server 118 issues a DEA command 324 including the Origin-Host AVP indicating secondary AAA server 118. Diameter Routing Agent 112 issues a corresponding DEA command 326 including the Origin-Host AVP indicating secondary AAA server 118 to Diameter client 301. In response, Diameter client 301 terminates all existing service sessions and PDN connections for that user with primary AAA server 116 according to the 3GPP standard. That is, Diameter client 301 terminates all data and voice calls of user equipment 102 authenticated by primary AAA server 116. Diameter client 301 initiates new authentications and authorizations with secondary AAA server 118 as indicated by commands 328 (which include EAP challenges, responses, etc.), and issues associated IKE_AUTH_RESPONSE 330 to user equipment 102.

Figure 4:
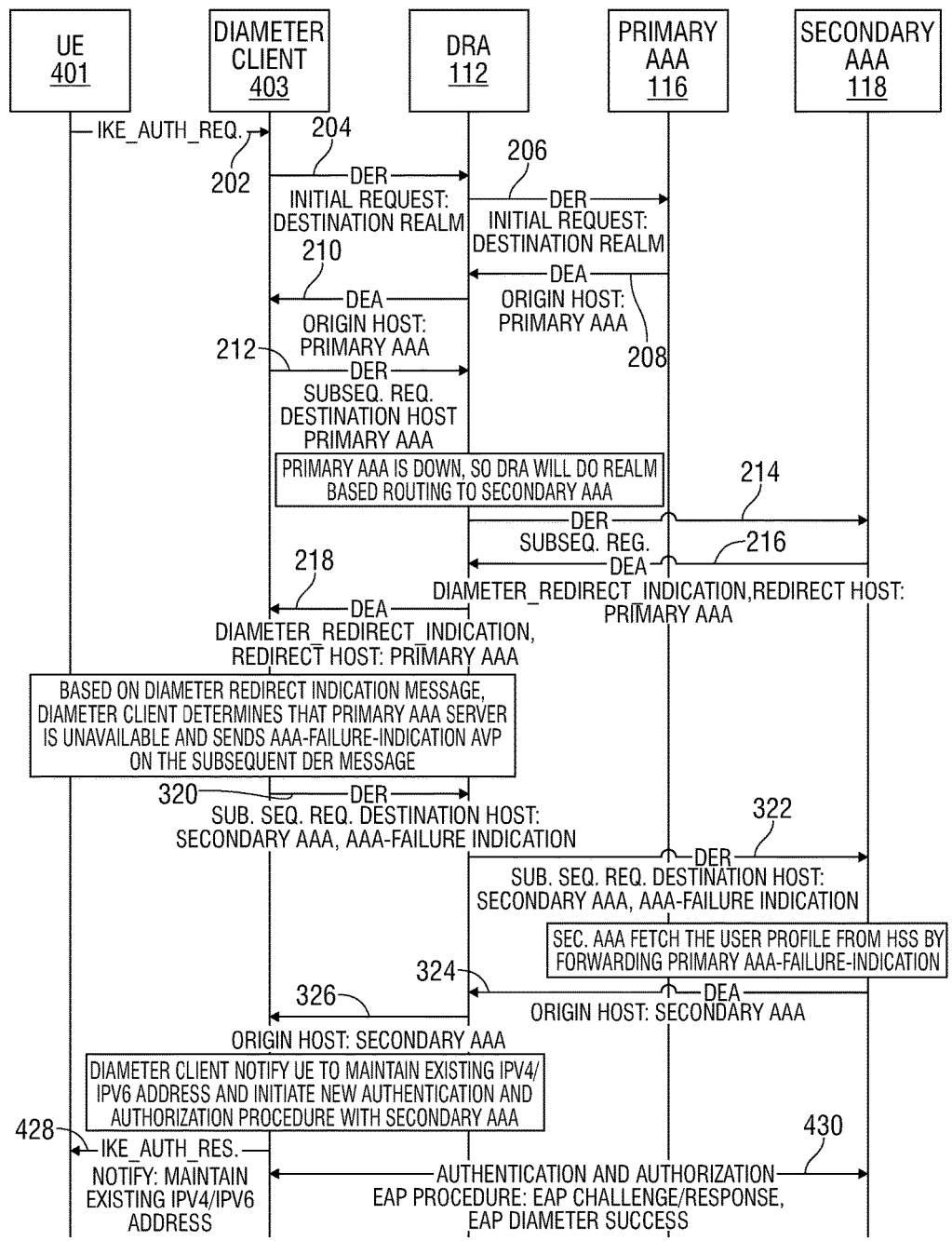
FIG. 4 illustrates information and control flows for authentication in a Diameter protocol communications network that redirects a Diameter client from a first AAA server to a second AAA server without terminating a prior existing service session authorized using the first AAA server consistent with at least one embodiment of the invention.

In at least one embodiment, in response to primary AAA server 116 becoming unavailable, the Diameter client notified the user equipment to maintain an IP address for a preexisting service session authenticated using primary AAA server 116 and to reauthenticate or authenticate for a new service session with secondary AAA server 118. Diameter client 110 of FIG. 1 is replaced by Diameter client 401 of FIG. 4 and user equipment 102 is replaced by user equipment 401. Referring to FIGS. 1 and 4, rather than terminating existing service sessions and PDN connections with P-GW 122 using the first IP address for user equipment 102 with the primary AAA server 116, as described above with reference to FIGS. 1-3, in at least one embodiment, Diameter client 403 issues IKE_AUTHENTICATION_RESPONSE command 428 to user equipment 401 with a Notify AVP indicating that user equipment 301 is to maintain the existing IP address and Diameter client 403 initiates a new authentication and authorization procedure with secondary AAA server 118 in response to subsequent requests. Diameter client 403 initiates new authentications and authorizations with secondary AAA server 118 as indicated by commands 430 (e.g., including EAP challenges, responses, etc.), which result in EAP Diameter success. Meanwhile, Diameter client 403 maintains the packet data network connection between user equipment 102 and services 124 via P-GW 122 and the unavailability of primary AAA server 116 does not impact services established using primary AAA server 116 prior to it becoming unavailable.

Figure 5:
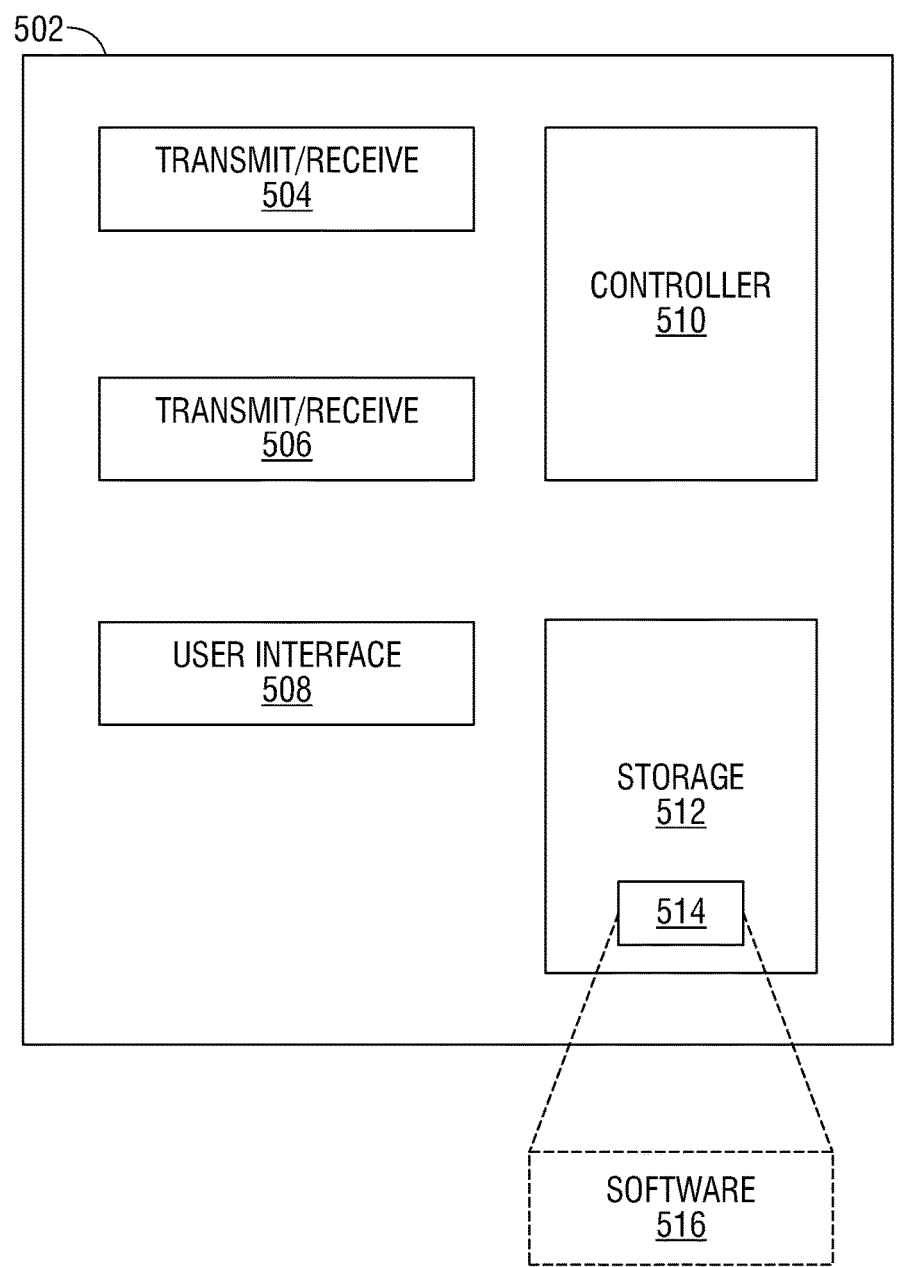
FIG. 5 illustrates a functional block diagram of exemplary nodes of the exemplary communications network of FIG. 1 consistent with at least one embodiment of the invention.

Referring to FIGS. 4 and 5, each network element (e.g., user equipment 401, Diameter client 403, DRA 112, primary AAA server 116, and secondary AAA server 118) may include a system 502 having transmit and receive interface 504, transmit and receive interface 506, user interface 508, controller 510, and storage 512, which may include software 516. For example, user equipment 401 may include transmit and receive interface 504 for communications with a local area network including access point 108. User equipment 401 may include transmit and receive interface 506 for communications with eNodeB 104 of a cellular network or other wide area network. Software 516 may include instructions for receiving an indication that primary AAA server 116 is unavailable and instructed to maintain an existing IP address for existing service sessions authenticated using AAA server 116, and to initiate a new authentication and authorization procedure with secondary AAA server 118.

In at least one embodiment, Diameter client 403 is an ePDG including a system 502 having transmit and receive interface 504 for communications with a local area network using access point 108 and a packet data network including DRA 112. Software 516 may include instructions for receiving an indication that primary AAA server 116 is unavailable and to notify user equipment 401 to maintain an existing IP address for existing service sessions authenticated using AAA server 116, and to initiate a new authentication and authorization procedure with secondary AAA server 118. Note that the information and control flows of FIGS. 3 and 4 are exemplary only one of skill in the art will appreciate that the teachings here may be used with other information and control flows consistent with the Diameter protocol or other suitable network protocol.

The components of the exemplary system 502 are either generally known in the art or based on those generally known in the art, although functionally some of those components have been modified or enhanced as described herein with respect to the present disclosure. System 502 may be a mobile phone, laptop, tablet, wearable device, server, or other computing system. System 502 in the illustrated embodiment is shown to have capability to communicate via two radio access technologies using transmitter and receiver 504 and transmitter and receiver 506 (RAT A and RAT B) although either or both may be wireline transceivers. In an exemplary embodiment RAT A is a cellular radio access technology and RAT B is a local area network radio access technology. Alternatively, in another example, transmitter and receiver 504 and transmitter and receiver 506 are a local area network radio access technology and a packet communications interface, respectively. System 504 includes a controller 510, such as a processor, microcontroller or similar data processing device that executes program instructions stored in storage 512. Typical transmitter functions including coding, mapping, and modulation are known in the art and are therefore not shown in any detail. Typical receiver functions, which are well known in the art and therefore not shown in any detail, include, e.g., intermediate frequency to baseband conversion, demodulation, constellation demapping, decoding, and/or descrambling according to the particular RF protocols and technology being employed. The receiver functions may be implemented in various combinations of analog and digital logic. In particular, the transmitter and receiver functions may use digital signal processing and controller 510 represents the necessary digital signal processing capability to implement necessary digital signal processing functions, even though one or more separate digital signal processors may be provided in system 502.

Storage 512 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

Controller 510 may be implemented as a single special purpose integrated circuit (e.g., ASIC) having a main or central processor unit for overall, system-level control, and separate sections dedicated to performing various specific computations, functions and other processes under the control of the central processor unit. Controller 510 can also be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. Controller 510 may also include other circuitry or components, such as memory devices, relays, mechanical linkages, communications devices, drivers and other ancillary functionality to affect desired control and/or input/output functions.

Controller 510 may be operatively coupled with user interface 508. User interface 508 may include items known in the art, such as a display, keypad, speaker, microphone, and other user interface I/O components. In one embodiment the controller 510 provides functionality to achieve Diameter protocol messaging. In the illustrated embodiment the controller utilizes software functionality 516 stored in memory 514 to implement at least a portion of the Diameter protocol logic necessary to achieve the correct functionality as described herein and including detecting and setting up new paths (path management), breaking application-layer byte stream into segments for each subflow (packet scheduling), reassembling and re-ordering subflow segments into connection-level data stream (subflow interface), and coordinating congestion control across subflows (congestion control). Diameter client 301 of FIG. 3 includes a controller 510 that utilizes software functionality 516 stored in memory 514 to implement at least a portion of the Diameter protocol logic necessary to achieve the correct functionality as described with reference to FIG. 3. User equipment 401 and Diameter client 403 of FIG. 4 each includes a controller 510 that utilizes software functionality 516 stored in memory 514 to implement at least a portion of the Diameter protocol logic necessary to achieve the correct respective functionality as described with reference to FIG. 4. While software may be used to implement aspects of control in user equipment, some aspects, such as signal strength measurement and establishing subflows utilize at least some hardware circuits and the particular segmentation between software and hardware control is implementation specific and thus can vary in different embodiments.

The techniques described above facilitate a Diameter client (originator of an Authentication and Authorization procedure) to infer from a Diameter message exchange with a secondary AAA server that a primary AAA is currently unavailable. The technique reduces or eliminates any Diameter client message loops for subsequent user equipment authentication. In least one embodiment of the technique, the Diameter client maintains existing service sessions and Packet Data Protocol contexts that were established using authentication with the initially available primary AAA server and notify the user equipment to maintain an IP address for an existing service to reduce or eliminate dropping ongoing service sessions (e.g., voice calls or data sessions) in response to a primary AAA server becoming unavailable.

Thus, techniques for redirecting a Diameter client command from a first server that has become unavailable to a second server consistent with a Diameter protocol includes the Diameter client indirectly determining that the first server is unavailable and sending a failure indicator in a subsequent command to the second server have been disclosed. The description of the invention set forth herein is illustrative, and is not intended to limit the scope of the invention as set forth in the following claims. For example, while the invention has been described in an embodiment in which the Diameter client is ePDG 110, one of skill in the art will appreciate that the teachings herein can be utilized with other Diameter clients. Variations and modifications of the embodiments disclosed herein, may be made based on the description set forth herein, without departing from the scope and spirit of the invention as set forth in the following claims.

What is claimed is:

1. A method comprising:
   transmitting a request for authentication of a user, the request being transmitted by a network node to a first authentication server;
   receiving a redirect indication by the network node from a second authentication server via a routing agent in response to transmission of the request;
   identifying, by the network node, the first authentication server as unavailable based on the redirect indication;
   sending a subsequent request for authentication of the user to the second authentication server, the subsequent request including a failure indication indicating the first authentication server as unavailable, the subsequent request being sent by the network node to the second authentication server; and
   receiving, by the network node, authentication of the user from the second authentication server in response to the subsequent request for authentication of the user.

2. The method, as recited in claim 1, wherein the request for authentication of the user and the subsequent request for authentication of the user are associated with user communications via a wireless access point of a local area network.

3. The method, as recited in claim 1, further comprising:
   establishing a first service session in response to authenticating the user by the first authentication server in response to a prior request for authentication; and
   sending a notification to the user to maintain an Internet Protocol (IP) address of the first service session.

4. The method, as recited in claim 3, further comprising:
   maintaining the first service session using the IP address of the first service session while the user is authenticated by the second authentication server.

5. The method, as recited in claim 1, further comprising:
   receiving an indication of authentication for a first service session in response to authenticating the user by the first authentication server in response to a prior request for authentication; and
   terminating the first service session in response to the failure indication.

6. The method, as recited in claim 1, further comprising: authenticating the user by the second authentication server including fetching a user profile from a subscriber server by the second authentication server using the failure indication.

7. The method, as recited in claim 1, wherein the first authentication server and the second authentication server are Diameter protocol authentication, authorization and accounting servers and the request for authentication and the subsequent request for authentication are Diameter Extensible Authentication Protocol (EAP) Request (DER) commands.

8. An apparatus comprising:
   a network node comprising:
      a communications interface configured to transmit to a first authentication server a request for authentication of a user, configured to receive a redirect indication from a second authentication server, configured to transmit a subsequent request for authentication of the user to the second authentication server, the subsequent request including a failure indication of the first authentication server being unavailable, and configured to receive authentication of the user from the second authentication server in response to the subsequent request for authentication of the user; and
      protocol processing logic being configured to identify the first authentication server as unavailable based on the redirect indication.

9. The apparatus, as recited in claim 8, further comprising: user equipment configured to maintain an existing service session using a wireless access point while the user is authenticated by the second authentication server for a second service session in response to a message from the network node, the existing service session being established with a first Internet Protocol (IP) address in response to authentication of the user by the first authentication server based on a prior request for authentication.

10. The apparatus, as recited in claim 8, wherein the protocol processing logic is further configured to request authentication of the user by the first authentication server in response to a prior request for authentication and send a notification to the user to maintain an Internet Protocol (IP) address of an existing service session in response to the redirect indication received from the second authentication server in response to the request.

11. The apparatus, as recited in claim 8, further comprising:
   the second authentication server configured to fetch a user profile from a subscriber server using the failure indication.

12. The apparatus, as recited in claim 8, further comprising:
   a routing agent coupled between the network node and the first authentication server and the second authentication server.

13. The apparatus, as recited in claim 12, wherein the network node is a Diameter protocol client and the routing agent is a Diameter protocol routing agent.

14. The apparatus, as recited in claim 8, wherein the network node is an evolved Packet Data Gateway.

15. The apparatus, as recited in claim 8, wherein a first subscriber management server and a second subscriber management server are Diameter protocol authentication, authorization and accounting servers and the request for authentication is a Diameter Extensible Authentication Protocol (EAP) Request (DER) message.

16. A method comprising:
   initiating authentication of a user with a first authentication server for a first service session with an Internet Protocol (IP) address using a local area network access point;
   in response to the first authentication server becoming unavailable:
      transmitting a notification to the user to maintain the IP address of the first service session; and
      initiating authentication of the user with a second authentication server for a second service session while maintaining the first service session using the IP address.

17. The method, as recited in claim 16, further comprising:
   identifying the first authentication server as unavailable based on a redirect indication received from the second authentication server via a routing agent in response to a request for authentication of the user to the first authentication server after establishing the first service session; and authenticating the user by the second authentication server in response to initiating authentication using an indication of a failure of the first authentication server.

18. The method, as recited in claim 17, wherein authenticating the user by the second authentication server comprises:
fetching a user profile from a subscriber server by the second authentication server using the indication of the failure of the first authentication server.

19. The method, as recited in claim 16, wherein the first authentication server and the second authentication server are Diameter protocol authentication, authorization and accounting servers.

* * * * *